United States Patent [19]

Dabringhaus

[11] 4,455,824
[45] Jun. 26, 1984

[54] WAVE MOTOR

[75] Inventor: Gustav H. Dabringhaus, Birmingham, Mich.

[73] Assignee: Gustav Dabringhaus Revocable Trust, Palm Beach, Fla.

[21] Appl. No.: 269,390

[22] Filed: Jun. 1, 1981

[51] Int. Cl.³ .......................................... F03B 13/12
[52] U.S. Cl. ........................................ 60/507; 60/496; 290/53
[58] Field of Search ................ 60/496, 497, 507, 398; 417/333; 290/42, 53; 137/209; 405/76

[56] References Cited

U.S. PATENT DOCUMENTS

| | | | |
|---|---|---|---|
| 773,285 | 10/1904 | Goedecke | 60/507 |
| 958,467 | 5/1910 | Bennett | 405/76 |
| 994,728 | 6/1911 | Edens | 60/499 |
| 1,444,693 | 2/1923 | Lymburner | 60/507 |
| 1,822,806 | 9/1931 | Geary | 60/507 |
| 2,820,148 | 1/1958 | Southwick | 405/76 |
| 3,512,426 | 5/1970 | Dabringhaus | 74/459 |
| 3,593,738 | 7/1971 | Baerfuss | 137/209 |
| 3,664,125 | 5/1972 | Strange | 60/398 |
| 3,746,875 | 7/1973 | Donatelli | 290/42 |
| 4,177,643 | 12/1979 | Lorphelin | 60/496 |
| 4,185,464 | 1/1980 | Rainey | 417/333 |

*Primary Examiner*—Robert E. Garrett
*Assistant Examiner*—Richard L. Klen
*Attorney, Agent, or Firm*—Gerald E. McGlynn, Jr.

[57] ABSTRACT

An apparatus for converting the periodic undulations of a body of water into electrical energy includes a support structure adapted to be mounted in a substantially fixed position relative to the surface of the body of water and extending a substantial distance above the surface. The apparatus also includes a float member movable relative to the support structure in response to the undulations of the surface, an electrical generator mounted on the support structure for generating electricity, and a nut and lead screw assembly of the type comprising a threaded screw member, a threaded nut member, and bearings disposed therebetween whereby the screw and nut members are axially and rotatably movable relative to each other. The screw member is connected to the float member, and the nut member is operatively connected to the generator whereby movement of the screw member with the float member drives the nut member and generator.

20 Claims, 2 Drawing Figures

WAVE MOTOR

BACKGROUND OF THE INVENTION (1) Field of the Invention

The instant invention relates to an apparatus for converting the undulating motion of waves into rotary motion of a driven mechanism such as a generator.

(2) Description of the Prior Art

A number of prior art patents teach the basic concept of converting the energy of natural wave motion into a usable form. A common problem encountered in all "wave motors" is to convert linear motion produced by the rise and fall of a float into rotary motion. Although the proper functioning of a wave motor is dependent upon several interacting factors, efficiency is the critical factor as with any power generating system. The instant invention provides means for obtaining the efficient performance required to produce a practical wave motor.

SUMMARY OF THE INVENTION

The instant invention provides an apparatus for converting the periodic undulations of a body of fluid into electrical energy. The apparatus includes a support structure adapted to be mounted in a substantially fixed position relative to the surface of the body of fluid, a float movable relative to the support structure in response to the undulations of the surface, and an electrical generator mounted on the support structure for generating electrical energy. The apparatus further includes a nut and lead screw assembly of the type comprising a threaded screw member, a threaded nut member, and bearing means disposed between the screw member and the nut member whereby the screw and nut members are axially and rotatably movable relative to each other. Means operatively connect one of the members to the float and the other of the members to the generator whereby movement of the former one of the members with the float drives the latter member and the generator.

PRIOR ART STATEMENT

The U.S. Pat. No. 994,728 to Edens teaches a shaft having helical threads which is forced to follow the rise and fall of a body of water by means of a float. The shaft includes both right and left hand helical threads which drive a pair of wheels. The wheels are both connected by ratchet devices to a single output gear. The ratchet devices are used to continuously drive the output gear in one direction even though the wheels reverse direction as the shaft rises and falls.

The U.S. Pat. No. 773,285 to Goedecke teaches a stationary threaded shaft which is force rotated as a float rises and falls. During the rise of the float, it engages a sleeve having a pin extending into the helical part of the shaft to force rotation of the shaft.

While the above-cited patents disclose the broad concept of a wave motor, they do not provide the means of the subject invention for increasing the efficiency and, thus, the practicality of a wave motor.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF PREFERRED EMBODIMENT

An apparatus for converting the periodic undulations of the surface of a body water into electrical energy is generally shown at 10.

Figure 1:
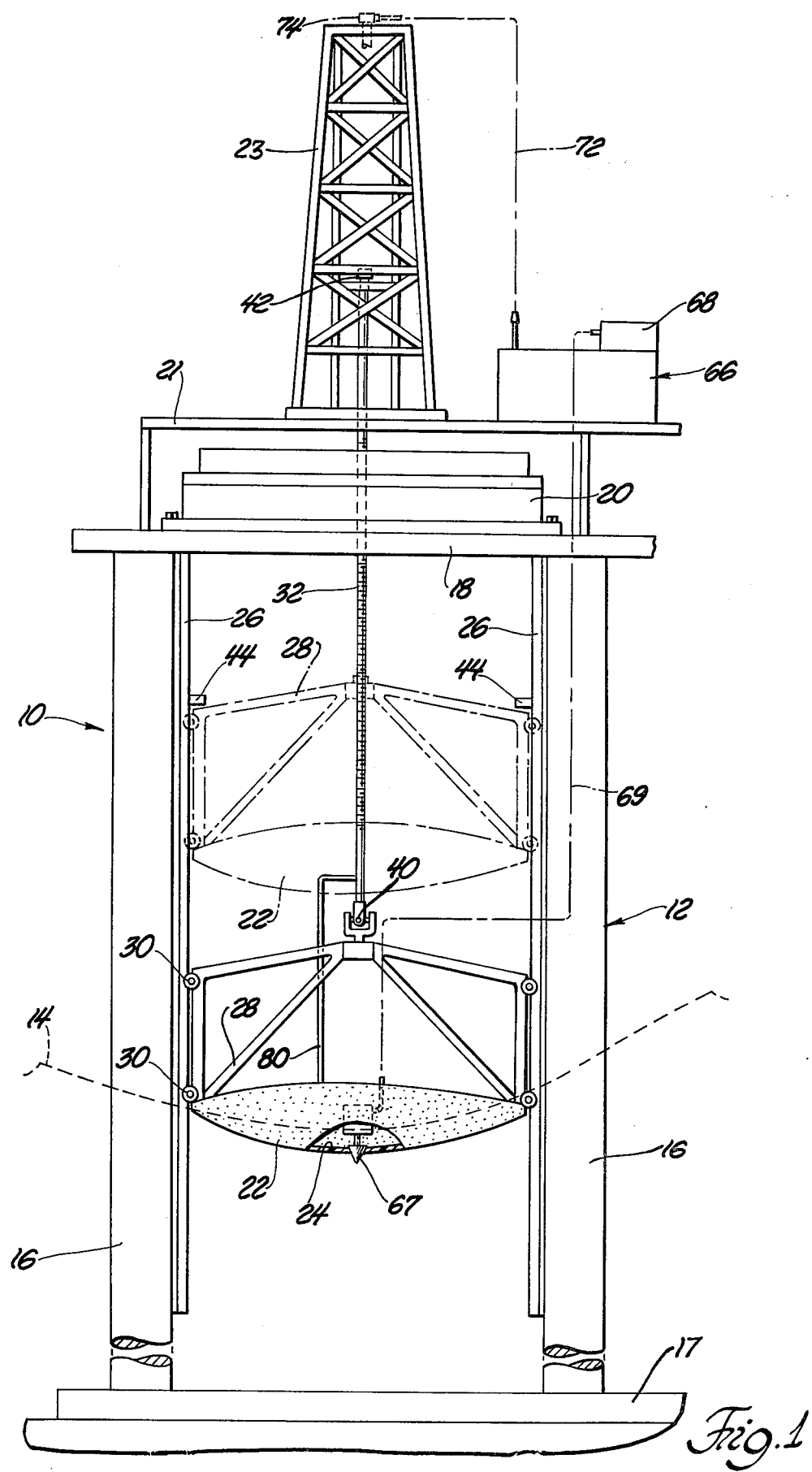
FIG. 1 is an elevational schematic view of a preferred embodiment of the instant invention.

As shown in FIG. 1, the apparatus 10 includes a support structure generally indicated at 12 and adapted to be mounted in a substantially fixed position relative to the surface of the body water 14 and extending a substantial distance above the surface. The support structure may be of the general type used to support a structure such as an off-shore drilling rig and includes beams 16 which extend upwardly from a base 17 suitably anchored to the floor of the body of water 14. The beams 16 support a platform 18, and the platform 18 supports a generator housing 20 and a rig platform 21. A frame structure 23, similar in design to an oil drilling rig, is supported above the generator housing 20 by the rig platform 21. It should be noted that the structures aforedescribed are schematically shown and may be adapted to various environments by changing the structures accordingly.

A float member 22 includes a hollow inner cavity 24 adapted to be selectively filled and unfilled with water and movable vertically, when not filled, along a guide track 26. The guide track 26 extends longitudinally along the support structure 12 and is fixed thereto. The float member includes a frame portion 28 having rollers 30 mounted thereon. The rollers 30 are in rolling contact with the guide track 26 for allowing vertical rising and falling movement of the float member 22 relative to the guide track 26 between the full-line and phantom-line positions of FIG. 1 in response to undulations of the surface 14 of the water. The guide means may take other structural forms for guiding the vertical movement of the float member 22. For example, a guide track could be structured to control the rising and falling movement of the float member and be totally structurally independent of the support structure.

Figure 2:
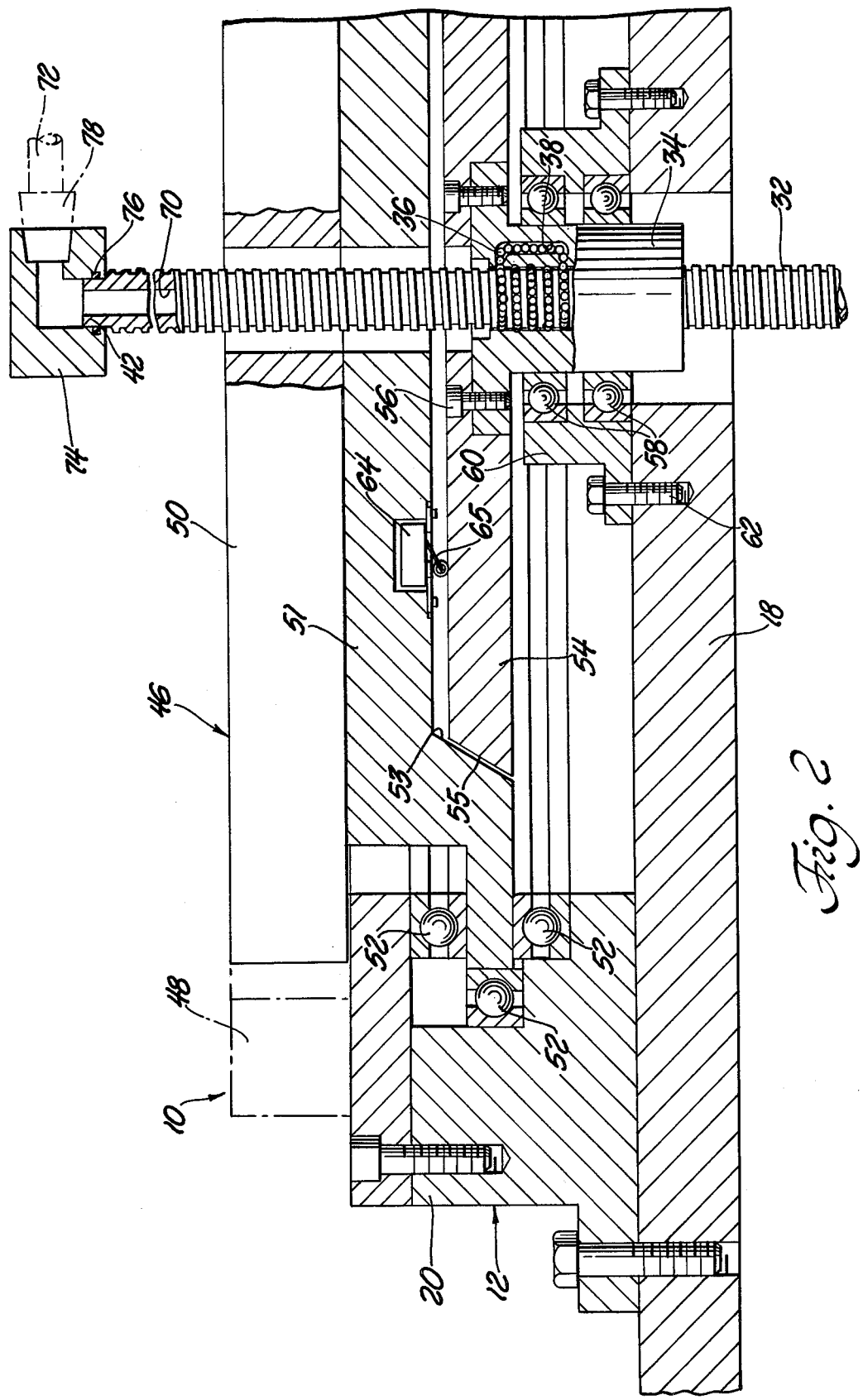
FIG. 2 is an enlarged schematic cross-sectional view, partially broken away to illustrate certain details, of the generator means and nut and lead screw assembly of the instant invention.

The rise and fall of the float member 22 is translated into rotary motion by a nut and lead screw assembly. The nut and lead screw assembly comprises a helically threaded screw member 32 and an internally helically threaded nut member 34, as shown in FIG. 2. Roller bearings 36 are disposed between the threads of screw member 32 and nut member 34. The ball bearings 36 circulate within the ball screw and nut assembly as disclosed by the U.S. Pat. 3,512,426 to G. H. Dabringhaus, the inventor of the subject matter of this application. Briefly, the ball screw and nut assembly has a ball return passageway 38 extending axially within the nut member 34 to allow circulation of the ball bearings 36 along and between the threads of the nut and screw members. This mechanism provides an extremely efficient linear-to-rotary motion translation from the screw member 32 to nut member 34, respectively.

The screw member 32 and nut member 34 are axially and relatively rotatably movable relative to each other. The screw member 32 includes a first terminal portion operatively connected at 40 to the frame 28 of the float member 22. The connection 40 is of the type which allows for small amounts of lateral or pivotal movement between the screw member 32 and frame 28 but prevents rotation of the screw member 32. the screw member 32 is vertically movable in response to the vertical movement of the float member 22. Even though the movement of the float member 22 and screw member 32 is substantially vertical, the connection 40 allows for some lateral or pivotal movement of the float member 22 and screw member 32 relative to each other.

The upper terminal portion 42 of the screw member 32 rises and falls within the rig 23, the rig 23 providing a protective vertical guide structure about the screw member 42. The support structure 16 further provides safety stop means 44 for limiting the upward movement of the float member 22 in response to the undulations of the water surface 14.

An electrical generator is indicated schematically at 46 in FIG. 2 and is mounted on the platform 18 on the housing 20 and above the surface 14 of the body of water. The generator may be of any conventional construction and is shown schematically in the drawings as being of the "pancake" type. Thus, electrical generator 46 includes first and second annular generator members 48 and 50, respectively. The first generator member 48 is suitably operatively fixed to the support structure 12. The second generator member 50 is suitably operatively fixed to an annular clutch ring 51 having an annular flange supported by suitable bearings 52 in housing 20 for rotation relative to the support structure 12 and generator member 48 to generate electrical energy. More specifically, the rotation of the second generator member 50 with clutch ring 51 and in relation to the fixed first generator member 48 generates electricity in a conventional manner.

An annular clutch plate 54 is suitably fixedly secured to the nut member 34 as by the fasteners 56. The nut member 34 is supported within suitable bearings 58 disposed within a support member 60 which is suitably fixedly secured, as by the fasteners 62, to the support platform 18. Support member 60 and bearings 58 support the nut member for rotatable movement as the screw member rises and falls while permitting slight rising and falling movement, substantially in unison with the screw member, as will be described more fully hereinafter. The clutch ring 51 includes a recessed cavity having an inner annular frustoconical clutch surface 53 for selective cooperative clutching engagement and disengagement with a corresponding outer annular peripheral frustoconical clutch surface 55 of the clutch plate 54.

Referring to the operation of the assembly as described thus far, it may be assumed that the float member 22 is disposed in a lowermost position disposed in a trough of a wave as illustrated in the full line position of FIG. 1. In this position, the clutch plate 54 and nut member 34 will be disposed somewhat downwardly away from the clutch ring 51; that is, the clutch surfaces 53 and 55 are disengaged. As a wave passes by the float member 22, the latter rises toward the phantom line position of FIG. 1. As the float member rises, the screw member 32 rises correspondingly while the connection 40 prevents rotation of the screw member 32. As the screw member initially rises, there is little if any rotation of the nut member 34 due to manufacturing tolerances built into the respective threads of the nut and screw members and the bearing elements 38 disposed therebetween, and also because there is no substantial load on the nut member 34. In other words, during this initial movement, the nut member 34 and the clutch plate 54 fixed thereto will rise upwardly in substantial unison with the nut member 34 to a first position in which the clutch surface 55 of the clutch plate clutchingly engages the clutch surface 53 of the clutch ring 51. At this time, further a axial or rising movement of the nut member is prevented, resulting in rotation of the nut member and the clutch plate 54 relative to the screw member 32 as the latter continues to rise. As a result, the second generator member 50 is rotatably driven to generate electricity.

The reverse occurs when the float member 22 begins to fall. More specifically, after the float member 22 rides over a peak of a wave and begins to descend, the load previously imposed on the nut member 34 is substantially instantaneously released resulting in the nut member moving downwardly a short distance within the bearings 58 in substantial unison with downward movement of the screw member 32. As a result, the clutch plate 54 is moved downwardly to a second position disengaged from the clutch surface of the clutch ring 51 and, hence, from the second generator member 50. Thus, the linear rising motion of the float member 22 is translated into rotary motion of the generator member 50, while falling movement of the float member declutches the nut member from the second generator member 50.

Means are provided for selectively energizing and deenergizing the windings of the generator, respectively, when the screw is rising and when the screw member is falling, so that the load of the generator is imposed only when the screw member is rising to generate electricity and is eliminated on the down stroke of the screw member. Such means is indicated schematically in FIG. 2 of the drawings as comprising a microswitch 64 disposed within the recessed cavity of the clutch ring 51 and having an arm 65 selectively engagable and disengagable with the upper face of the clutch plate 54. Thus, as the screw member 32 rises to engage the clutch plate 54 with the clutch ring 51 as shown in FIG. 2, the microswitch is activated to energize the windings of the generator to generate electricity. When the screw member 32 initially begins to fall as previously described to move the clutch plate 54 to its second position disengaged from the clutch ring 51, the microswitch 64 functions to deenergize the windings of the generator. Consequently, the generator is rotatably driven in one direction with its windings energized to generate electricity as the screw member 32 rises, while the windings of the generator are deenergized as the screw member 32 falls.

It should be noted at this juncture that, as the screw member 32 falls, the second generator member 50 and clutch ring 51 function as a flywheel; that is, they continue rotating at a decreasing rate of speed. Thus, when the screw member 32 begins its next cycle of rising movement to engage clutch plate 54 with clutch ring 51, the inertial energy stored within the second generator member 50 and clutch ring 51 are used to diminish the load which otherwise would be imposed on the screw and nut assembly in beginning another cycle of generating electrical energy.

The instant invention further provides means for selectively submerging and refloating the float member 22 as desired. For example, a hurricane or other severe storm may arise during which time it is desired to substantially reduce to a predetermined extent or, alternatively, substantially eliminate the normal vertical oscillatory working strokes of the screw member 32. In another situation, it may be desirable to do so to perform maintenance on one or more components of the assembly. To this end, valve means 67 is illustrated schematically in FIG. 1 as cooperating with a suitable port in the float member 22 to control the ingress and egress of water from the cavity 24 of the float member 22. The valve means 67 is controlled by a control station illustrated schematically at 68 which is operatively connected as illustrated schematically at 69 to the valve means 67. The valve means 67 may be of any conventional type desired such as, for example, a solenoid operated valve wherein the operative connection 69 would be an electrical circuit. Naturally, numerous of the valve means 67 may be employed due to the extremely large size of the float member 22 in actual use. The valve means 67 has an open position for allowing the ingress of water into the cavity 24 of the float member as well as the forced egress of such water from the cavity as will be described, and a closed position to seal the cavity, the latter position being illustrated schematically in FIG. 1.

Thus, if a storm or other condition should arise where it is desired to drastically diminish the buoyancy of the float member 22 for the purposes aforementioned, the control station 68 is operated to open the valve means 67 to allow water to flow into the cavity of the float member 22 to partially or substantially wholly submerge it beneath the surface of the body of water.

After the condition has passed which prompted the addition of water to the cavity of the float member, means are provided for expulsion of the water from the cavity to restore the buoyancy of the float member 22. The water expulsion mechanism includes a source of air under pressure indicated generally and schematically at 66 in FIG. 1. As shown in the broken away section of FIG. 2, the screw member 32 includes a hollow core 70. The hollow core 70 decreases the weight of the screw member 32 and also functions as a conduit for air under pressure as will be described hereinafter. A first conduit 72 is adapted to be selectively operatively connected between the source of air under pressure 66 and the upper end of the hollow core 70 of the scre wmember 32. A terminal member 74 is fixedly secured to the upper end of the screw member 32. A seal 76 is disposed between the terminal member 74 and the screw member 32 for perfecting a seal therebetween. As illustrated schematically in the drawings, the conduit 72 may take the form of a retractable hose having a quick connect-disconnect coupling member 78 which can be connected and disconnected from the terminal member 74. A second conduit 80 operatively connects the other end of the hollow core 70 of the screw member 32 to the inner cavity 24 of the float member 22.

In operation, it may be assumed that the inner cavity 24 of the float member 22 has been filled with water as previously described, and it is desired to restore the buoyancy of the float member 22 by expelling such water from the cavity of the float member. The quick connect coupling member 78 of conduit 72 is coupled to the terminal member 74 at the upper end of the hollow core of the screw member 32, and the valve means 67 is opened. The source of air under pressure 66 is activated to force air under pressure through the conduit 72, the hollow core 70 of the screw member 32 and the conduit 80 into the inner cavity 24 of the float member to expel water therefrom through the open valve means 67.

When the water is expelled, the valve means 67 is closed and the float member 22 is once again buoyant and fully responsive to wave motion. The conduit 72 may then be disconnected from the terminal member 74 and stored.

The instant invention has been described in an illustrative manner, and it is to be understood that the terminology which has been used is intended to be in the nature of words of description rather than limitation. Obviously, any modifications and variations of the present invention are possible in light of the above teachings. Therefore, it will be understood that the invention may be practiced otherwise than as specifically described within the scope of the appended claims.

The embodiments of the invention in which an exclusive property or privilege is claimed are defined as follows:

1. An apparatus for converting the periodic undulations of a body of a fluid into energy, said apparatus comprising:
   support means adapted to be mounted in a substantially fixed position relative to the surface of the body of the fluid;
   float means movable relative to said support means in response to the undulations of the surface;
   energy generating means mounted on said support means for generating energy;
   a nut and lead screw assembly of the type comprising a threaded screw member, a threaded nut member, and bearing means disposed between said screw member and said nut member whereby said screw and nut members are axially and rotatably movable relative to each other; and
   means operatively connecting one of said members of said float means and the other of said members to said generator means whereby movement of said one of said members with said float means drives said other of said members and said generator means and wherein said connecting means includes clutch means secured to said other of said members of said nut and lead screw assembly for movement therewith and having a first position engaging said energy generating means to drive the latter to generate energy when said one member of said nut and lead screw assembly is rising and a second position disengaged from said energy generating means when said one member is falling.

2. An apparatus for converting the periodic undulations of a body of fluid into electrical energy, said apparattus comprising:
   support means adapted to be mounted in a substantially fixed position relative to the surface of the body of fluid;
   float means movable relative to said support means in response to the undulations of the surface;
   electrical generator means mounted on said support means for generating electrical energy;
   a nut and lead screw assembly of the type comprising a threaded screw member, a threaded nut member, and bearing means disposed therebetween whereby said screw and nut members are axially and rotatably movable relative to each other; and
   means operatively connecting said screw member to said float means and said nut member to said generator means whereby movement of said screw member with said float means drives said nut member and said generator means and wherein said connecting means includes clutch means secured to said nut member for movement therewith and having a first position engaging said generator means to rotatably drive said generator means to generate electricity when said screw member is rising and a second position disengaged from said generator means when aid screw member is falling.

3. An apparatus as set forth in claim 2 including switch means disposed between said generator means and said clutch means for energizing said generator means when said clutch means is in said first position and deenergizing said generator when said clutch means is in said second position.

4. An apparatus as set forth in claim 3 wherein said electrical generator means includes first and second generator members, said first generator member being relatively fixed in relation to said support means and said second generator member being rotatable relative to said support means and said first generator member to generate electrical energy, said clutch means engaging said second generator member in said first position and being disengaged from said second generator member in said second position.

5. An apparatus as set forth in claim 4 wherein said clutch means includes a clutch plate having a frustoconical annular outer surface, said second generator member being operatively secured to a clutch ring having a frustoconical annular inner surface, said outer surface of said clutch plate engaging said inner surface of said clutch ring when said clutch plate is in said first position.

6. An apparatus as set forth in claim 5 wherein said float means includes a hollow inner cavity adapted to be selectively filled and unfilled with the fluid.

7. An apparatus as set forth in claim 6 wherein said float means includes valve means having opened and closed positions for controlling the ingress and egress, respectively, of the fluid from said inner cavity of said float means.

8. An apparatus as set forth in claim 7 further comprising fluid expulsion means for expelling fluid from said inner cavity of said float means when said valve means is in said open position.

9. An apparatus as set forth in claim 8 wherein said fluid expulsion means includes a source of air under pressure and conduit means for operatively connecting said source to said inner cavity of said float means whereby said source forces air through said conduit means and into said inner cavity of said float means to expel the fluid from said float means.

10. An apparatus as set forth in claim 9 wherein said screw member has a hollow inner core, said conduit means including a first conduit for operatively connecting said source of air to an upper portion of said hollow core and a second conduit for operatively connecting a lower portion of said hollow core to said inner cavity of said float means.

11. An apparatus as set forth in claim 10 wherein said support means includes guide means for guiding the vertical movement of said float means in response to the undulations of the surface of the fluid.

12. An apparatus as set forth in claim 11 wherein said guide means comprises a guide track extending longitudinally along said support means and fixedly secured thereto, said float means including a frame portion having rollers mounted thereon, said rollers being in rolling contact with said guide track for guiding the vertical movement of said float means relative to said guide track.

13. An apparatus as set forth in claim 2 wherein said float means includes a hollow inner cavity adapted to be selectively filled and unfilled with the fluid.

14. An apparatus as set forth in claim 13 wherein said float means includes valve means having opened and closed positions for controlling the ingress and egress, respectively, of the fluid from said inner cavity of said float means.

15. An apparatus as set forth in claim 14 further comprising fluid expulsion means for expelling fluid from said inner cavity of said float means when said valve means is in said open position.

16. An apparatus as set forth in claim 15 wherein said fluid expulsion means includes a source of air under pressure and conduit means operatively connecting said source to said inner cavity of said float means whereby said source forces air through said conduit means and into said inner cavity of said float means to expel the fluid from said float means.

17. An apparatus as set forth in claim 16 wherein said screw member has a hollow inner core with a first and second end, said conduit means including a first conduit for operatively connecting said source to said first end and a second conduit for operatively connecting said second end to said inner cavity of said float means.

18. An apparatus as set forth in claim 17 wherein said support means includes guide means for guiding the vertical movement of said float means in response to the undulations of the surface of the fluid.

19. An apparatus as set forth in claim 18 wherein said guide means comprises a guide track extending longitudinally along said support means and fixedly secured thereto, said float means including a frame portion having rollers mounted thereon, said rollers being in rolling contact with said guide track for guiding the vertical movement of said float means relative to said guide track.

20. An apparatus for converting the periodic undulations of the surface of a body of water into electrical energy, said apparatus comprising:

a support structure adapted to be mounted in a substantially fixed position relative to the surface of the body of water and extending a substantial distance above the surface;

a float member including a hollow inner cavity adapted to be selectively filled and unfilled with water;

a guide track extending longitudinally along said support structure and fixedly secured thereto, said float member including a frame portion having rollers mounted thereon and in rolling contact with said guide track for allowing vertical rising and falling movement of said float member relative to said guide track in response to the undulations of the surface;

a nut and lead screw assembly of the type comprising a threaded screw member, a threaded nut member, and bearing means disposed therebetween whereby said screw member and said nut member are axially and rotatably movable relative to each other, said screw member having a hollow inner core and being operatively connected at one end to said frame portion of said float member and being vertically movable in response to the vertical movement of said float member;

an electrical generator mounted on said support structure above the surface of the body of water and including first and second generator members, said first generator member being relatively fixed in relation to said support structure and said second generator member being supported by said support structure and being rotatable relative thereto and relative to said first generator member to generate electrical energy;

clutch means secured to said nut member for movement with the latter and having a first position operatively engaging said second generator member to rotatably drive the latter to generate electricity when said screw member is rising and a second position operatively disengages from said second generator member when said screw member is falling;

switch means operatively disposed between said second generator member and said clutch means for energizing said electrical generator when said clutch means is in said first position and deenergizing said generator when said clutch means is in said second position;

valve means for selectively controlling the ingress and egress of water from said cavity of said float member, said valve having open and closed positions;

a water expulsion mechanism for expelling water from said inner cavity of said float member and including a source of air under pressure and a first conduit for operatively connecting said source to an upper portion of said hollow core of said screw member and a second conduit for operatively connecting a lower portion of said hollow core of said screw member to said inner cavity of said float member whereby said source supplies air through said conduits and said hollow core of said screw member and into said inner cavity of said float member to expel water from said float member when said valve is in said open position.

* * * * *